United States Patent
Ip et al.

(10) Patent No.: US 11,960,042 B2
(45) Date of Patent: Apr. 16, 2024

(54) LASER NOISE REDUCTION FOR LASER INTERFEROMETRY

(71) Applicant: NEC Laboratories America, Inc., Princeton, NJ (US)

(72) Inventors: Ezra Ip, West Windsor, NJ (US); Yue-Kai Huang, Princeton, NJ (US); Fatih Yaman, Princeton, NJ (US)

(73) Assignee: NEC Corporation, Tokyo (JP)

( * ) Notice: Subject to any disclaimer, the term of this patent is extended or adjusted under 35 U.S.C. 154(b) by 401 days.

(21) Appl. No.: 17/307,991

(22) Filed: May 4, 2021

(65) Prior Publication Data

US 2021/0356613 A1  Nov. 18, 2021

Related U.S. Application Data

(60) Provisional application No. 63/023,283, filed on May 12, 2020.

(51) Int. Cl.
| | |
|---|---|
| *G01V 1/22* | (2006.01) |
| *G01V 1/38* | (2006.01) |
| *H04B 10/077* | (2013.01) |
| *H04J 14/02* | (2006.01) |
| *H04L 7/00* | (2006.01) |

(52) U.S. Cl.
CPC ............... *G01V 1/226* (2013.01); *G01V 1/38* (2013.01); *H04B 10/077* (2013.01); *H04J 14/02* (2013.01); *H04L 7/0075* (2013.01)

(58) Field of Classification Search
None
See application file for complete search history.

(56) References Cited

U.S. PATENT DOCUMENTS

| | | | | |
|---|---|---|---|---|
| 2009/0059996 A1* | 3/2009 | Komeda | ................ | G01K 11/32 374/161 |
| 2012/0039360 A1* | 2/2012 | MacDougall | .......... | G01K 11/32 374/161 |
| 2017/0153155 A1* | 6/2017 | Hull | ........................ | G01L 1/246 |

OTHER PUBLICATIONS

6. Marra, Giuseppe, et al. "Seismology with optical links: enabling a global network for submarine earthquake monitoring." arXiv preprint arXiv:1801.02698 (2017) (Year: 2017).*
7. Marra, Giuseppe, et al. "Ultrastable laser interferometry for earthquake detection with terrestrial and submarine cables." Science 361.6401 (2018): 486-490 (Year: 2018).*

* cited by examiner

*Primary Examiner* — Dominic J Bologna
*Assistant Examiner* — Roberto Fabian, Jr.
(74) *Attorney, Agent, or Firm* — Joseph Kolodka (57) ABSTRACT

Aspects of the present disclosure are directed to laser interferometric systems, methods, and structures exhibiting superior laser phase noise tolerance particularly in seismic detection applications wherein laser requirements are advantageously relaxed by employing a novel configuration wherein the same laser which generates an outgoing signal is coherently detected using the same laser as local oscillator and fiber turnarounds are employed that result in the cancellation and/or mitigation of undesired mechanical vibration.

12 Claims, 7 Drawing Sheets

LASER NOISE REDUCTION FOR LASER INTERFEROMETRY

CROSS REFERENCE

This disclosure claims the benefit of U.S. Provisional Patent Application Ser. No. 63/023,283 filed May 12, 2020 the entire contents of which is incorporated by reference as if set forth at length herein.

TECHNICAL FIELD

This disclosure relates generally to the detection of low frequency vibrations using laser interferometry. More particularly it pertains to systems, methods, and structures for low frequency vibration (i.e., seismic) detection exhibiting an improved laser phase noise tolerance through the use of fiber turnarounds.

BACKGROUND

As is known, the detection of low frequency vibrations using ultra-stable laser interferometry is difficult, due in part to laser phase noise, particularly 1/f technical noise, which can swamp (overwhelm) any low frequency vibration(s) that one is trying to detect. A conventional method is to use an ultra-stable laser having a linewidth on the order of 1 Hz, taking special care to isolate the laser chamber mechanically and thermally to reduce the 1/f technical noise. Lasers exhibiting such characteristics are extremely expensive, and mechanical isolation may be operationally difficult depending upon an environment in which it is operating.

SUMMARY

An advance in the art is made according to aspects of the present disclosure directed to laser interferometric systems, methods, and structures exhibiting superior laser phase noise tolerance particularly in seismic detection applications.

In sharp contrast to the prior art, systems, methods and structures according to aspects of the present disclosure advantageously relax laser requirements by exhibiting a novel configuration wherein the same laser which generates an outgoing signal is coherently detected using the same laser as local oscillator. According to further aspects of the present disclosure, the use of fiber turnarounds allows for the cancellation and/or mitigation of undesired mechanical vibration.

BRIEF DESCRIPTION OF THE DRAWING

A more complete understanding of the present disclosure may be realized by reference to the accompanying drawing in which.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

Figure 1:
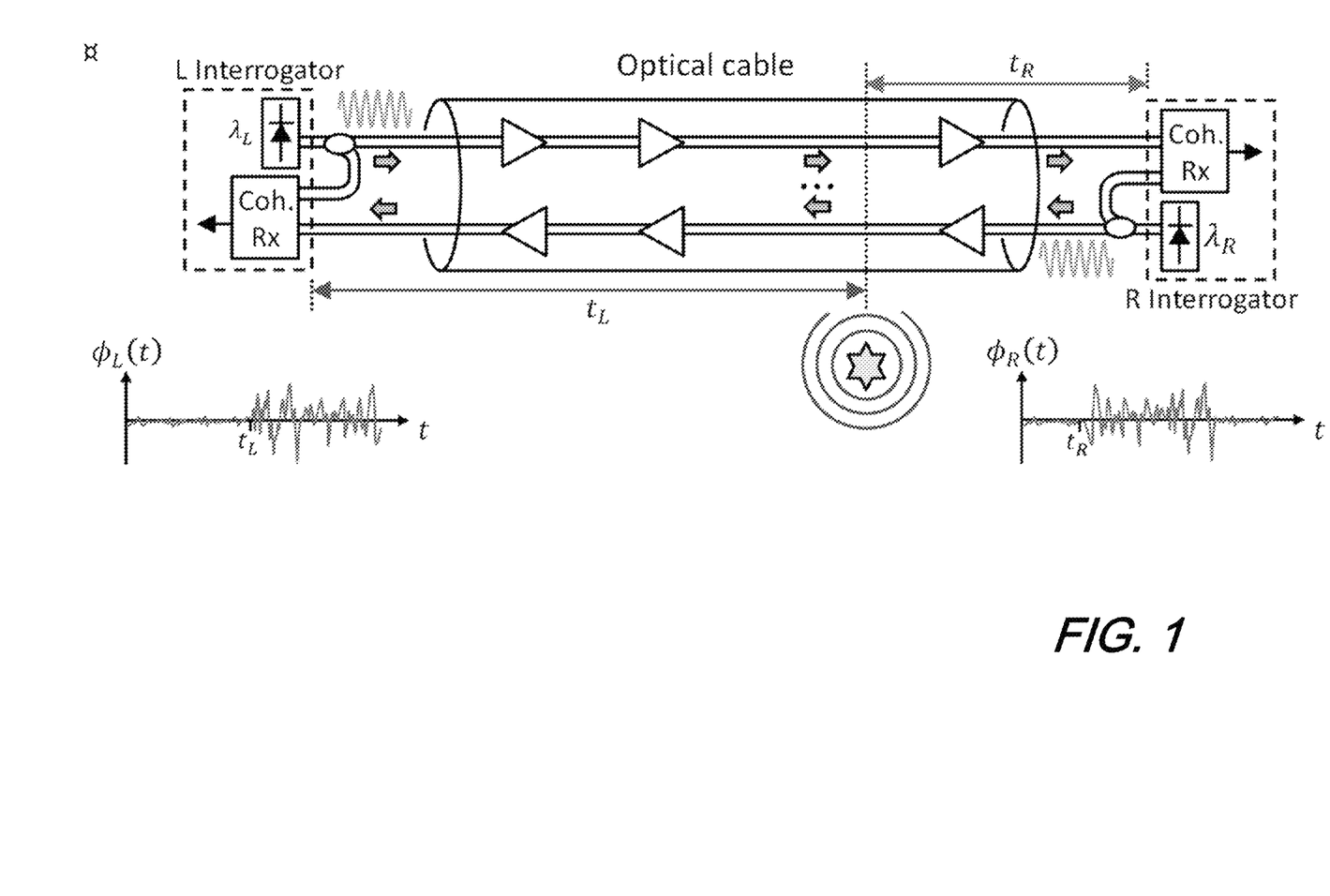
FIG. 1 shows a schematic diagram of an illustrative prior art configuration for detecting mechanical vibrations on an optical cable using ultra-stable laser interferometry.

FIG. 1 shows a schematic diagram of an illustrative prior art configuration for detecting mechanical vibrations on an optical cable using ultra-stable laser interferometry. As may be observed in that figure, a continuous-wave (CW) laser having a linewidth of approximately 1 Hz generates laser light that is launched into an optical fiber located inside a submarine cable. The submarine cable link may extend over multiple spans, wherein the laser light signal is periodically amplified by inline optical amplifiers. At a receiver, the laser light output signal is coherently detected using a second CW laser as local oscillator (LO).

Those skilled in the art will understand and appreciate that the complex-valued baseband photocurrent takes the form of:

$$I(t) = R\sqrt{P_r P_{LO}} \exp(j(\phi_{vib}(t) + \phi_L(t) - \phi_R(t))) + n(t), \quad (1)$$

where R is the responsivity of the photoreceiver, $P_r$ and $P_{LO}$ are the powers of the received signal and LO at the input of the coherent receiver, respectively. It is assumed that the lasers included in both interrogators—are operating and outputting light at substantially the same wavelength $\lambda_L = \lambda_R = \lambda$, where $\phi_L(t)$ and $\phi_R(t)$ are phase noises of the left (L) interrogator (transmitter) and right (R) interrogator (receiver-local oscillator), respectively, n(t) is a photocurrent arising from all the noise sources in the system, including amplified spontaneous emission (ASE) of all the inline amplifiers, as well as any shot noise and any thermal noise in the coherent receiver.

The variable of interest is $\phi_{vib}(t)$, which is the optical phase arising from cumulative strain along the fiber, and takes the form of:

$$\phi_{vib}(t) = -\frac{2\pi}{\lambda} \int_0^{L_{tot}} \Delta\epsilon(z) dz, \quad (2)$$

where $L_{tot}$ is the length of the optical cable, and $\Delta\epsilon(z)$ is the tensile strain at position z along the fiber optic cable.

A usual method of recovering $\phi_{vib}(t)$ is to take the unwrapped phase of the photocurrent:

$$\phi(t) = \angle I(t) = \phi_{vib}(t) + \phi_L(t) - \phi_R(t) + \phi_{AWGN}(t). \quad (3)$$

where $\phi_{AWGN}$ is the angle formed by the projection of n(t) onto a vector perpendicular to $R\sqrt{P_r P_{LO}} \exp(j(\phi_{vib}(t) + \phi_L(t) - \phi_R(t)))$.

Figure 2:
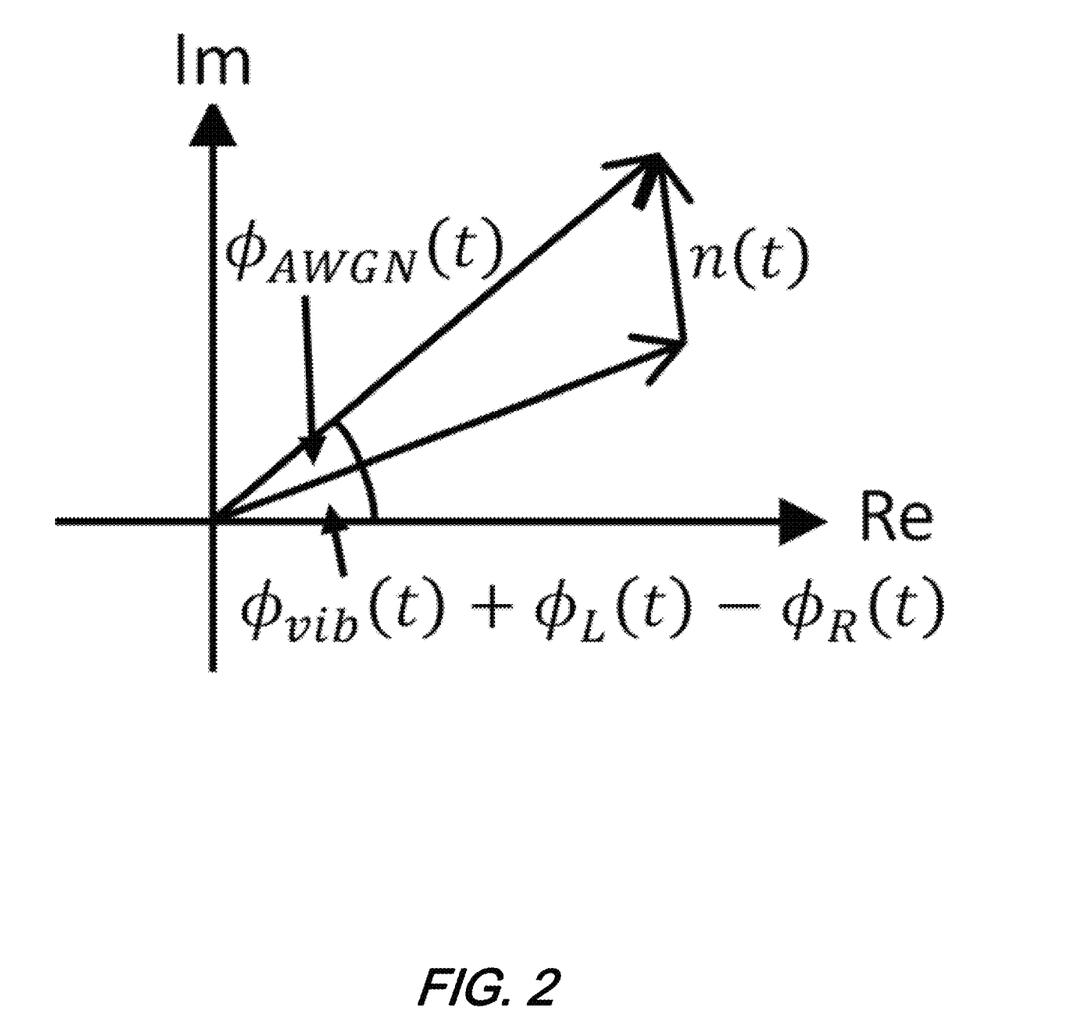
FIG. 2 shows a phasor diagram showing the impact of additive white Gaussian noise on vibration detection using interferometric phase.

FIG. 2 shows a phasor diagram showing the impact of additive white Gaussian noise on vibration detection using interferometric phase. In the absence of seismic vibration, $\phi(t)$ varies over only a narrow range due to phase noise and AWGN. In presence of seismic vibration, $\phi(t)$ is dominated by $\phi_{vib}(t)$, and its excursion may reach hundreds to thousands of radians depending on the strength of the vibration.

Due to signal propagation delay, the onset of rapid phase variation will only be apparent to the receiver at time $t_R = t + (L - z_{vib})/(c/n_{eff})$, where t is the instance at which the seismic wave first impinges the optical cable at position $z_{vib}$ from the transmitter, which is the closest point to the epicenter. $n_{eff}$ is the effective index of the fiber. To determine $z_{vib}$, a bidirectional link can be implemented: suppose an identical system as above propagates from right to left as shown in FIG. 1.

The onset of rapid phase variation will occur for the L interrogator at $t_L = t + z_{vib}/(c/n_{eff})$. The time difference $t_R - t_L = (L_{tot} - 2z_{vib})/(c/n_{eff})$ can then be used to infer $z_{vio}$ since 4" is known. Using bidirectional transmission for multiple submarine cables allows determination of the epicenter of an earthquake by triangulation. Ultrastable laser interferometry relies on: (i) ultra-narrow linewidth lasers, and (ii) clock synchronization of all interrogators, which may be achieved by synchronization with respect to global positioning system (GPS).

Figure 3:
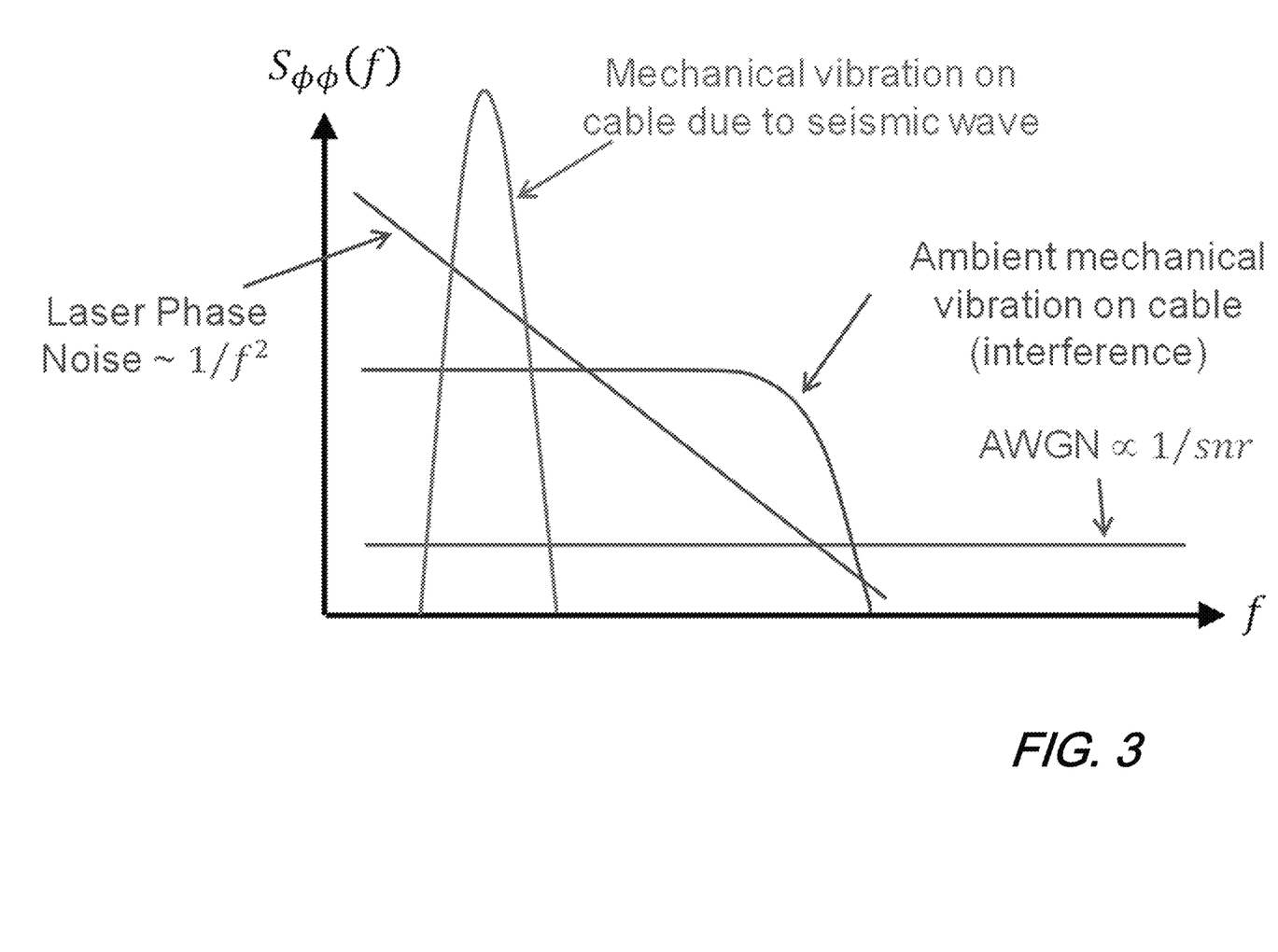
FIG. 3 shows a plot/spectrum of laser phase noise, additive white Gaussian noise and ambient mechanical vibration showing the condition on detecting the presence of seismic wave(s)

One key to determining the onset of rapid phase variation is that $\phi_{vib}(t)$ can be distinguished from cumulative noise sources $\phi_L(t) - \phi_R(t) + \phi_{AWGN}(t)$ Performance can be analyzed in the frequency domain as shown in FIG. 3, which shows a plot/spectrum of laser phase noise, additive white Gaussian noise and ambient mechanical vibration showing the condition on detecting the presence of seismic wave(s).

Laser frequency noise can be modeled as a two-sided power spectral density (PSD) of:

$$S_{vv}(f) = \frac{\Delta v}{2\pi}\left(1 + \frac{f_0}{f}\right)[\text{Hz}^2/\text{Hz}]. \quad (4)$$

where $\Delta v$ is the Lorentzian linewidth (in Hz) arising from spontaneous emission inside the laser cavity. At low frequencies, however, a laser's frequency spectrum is usually dominated by 1/f "technical" noise, which can be interpreted as slow drift of the laser's center frequency. The fitting parameter $f_0$ is the frequency at which frequency noise due to technical noise becomes equal to spontaneous emission. Since laser phase $\phi_{PN}(t) = 2\pi \int_{-\infty}^{t} v(t') dt'$ is the integral of frequency noise, the two-sided PSD of laser phase noise is:

$$S_{\phi_{PN}\phi_{PN}}(f) = \frac{1}{f^2} S_{vv}(f)[\text{rad}^2/\text{Hz}], \quad (5)$$

while the two-sided PSD of $\phi_{AWGN}(t)$ is:

$$S_{\phi_{AWGN}\phi_{AWGN}}(f) = \frac{1}{2\eta}[\text{rad}^2/\text{Hz}] \quad (6)$$

where $\eta$ is the signal-to-noise (SNR) ratio of the received signal.

From FIG. 3, it is apparent that vibration $\phi_{vib}(t)$ can be detected provided there exists frequency components over which its power spectral density is higher than the sum of laser phase noise and AWGN: $S_{\phi_{vib}\phi_{vib}}(f) > S_{\phi_{PN}\phi_{PN}}(f) + S_{\phi_{AWGN}\phi_{AWGN}}(f)$ for $f \neq \{\emptyset\}$. Furthermore, from FIG. 3, it is possible to improve vibration detection SNR by either: (i) increasing the PSD of $\phi_{vib}(t)$, (ii) decreasing the PSD of $\phi_{PN}(t)$, or decreasing the PSD of $\phi_{AWGN}(t)$.

We shall now show and describe in greater detail, systems, methods, and structures according to aspects of the present disclosure advantageously employ fiber turnarounds to improve laser phase noise tolerance in low frequency (seismic) detection using ultra-low linewidth interferometry.

As we have previously noted, a conventional, prior-art configuration includes a transmitter and a receiver positioned at opposite ends of a submarine optical fiber link, such that the transmitter laser and local oscillator laser are two different lasers.

In sharp contrast, systems, methods, and structures according to aspects of the present disclosure incorporate a fiber turnaround at the far end of the submarine optical fiber link such that the outgoing (transmitted) signal is routed back to the same transmitter side of the submarine fiber optic cable thereby advantageously allowing a single laser to serve as transmitter and local oscillator in a coherent interferometry arrangement. It will be appreciated by those skilled in the art that such an arrangement helps reduce phase noise at low frequencies where seismic vibration energy is concentrated, thereby allowing increased sensitivity, increased sensing range, and/or the use of less expensive lasers in the interrogators.

Figure 4:
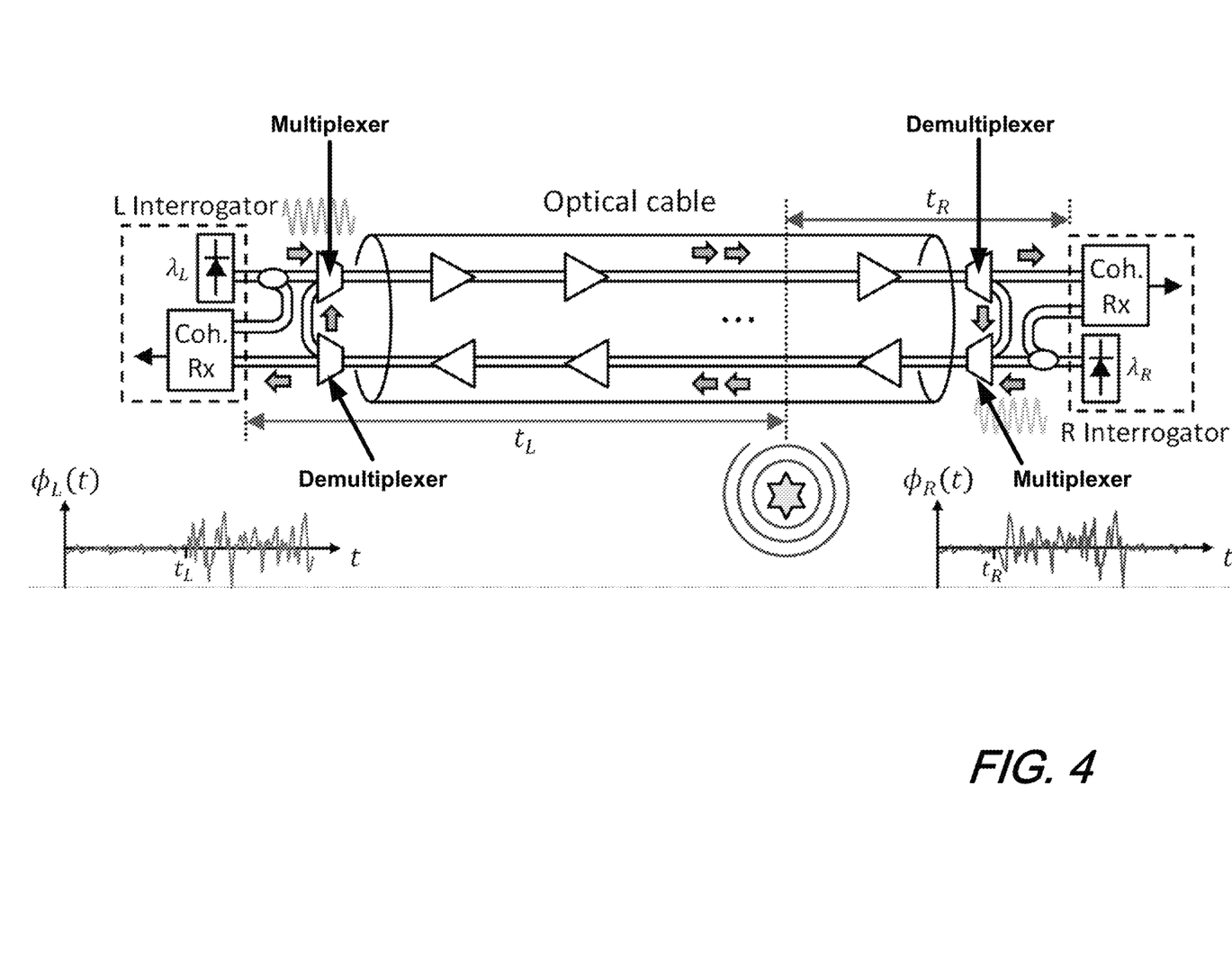
FIG. 4 shows schematic diagram of an illustrative improved configuration for detecting seismic vibration(s) using ultra-stable laser interferometry according to aspects of the present disclosure wherein a same laser that generates an outgoing signal also provides local oscillator allowing for mitigation of low-frequency laser phase noise.
Figure 6:
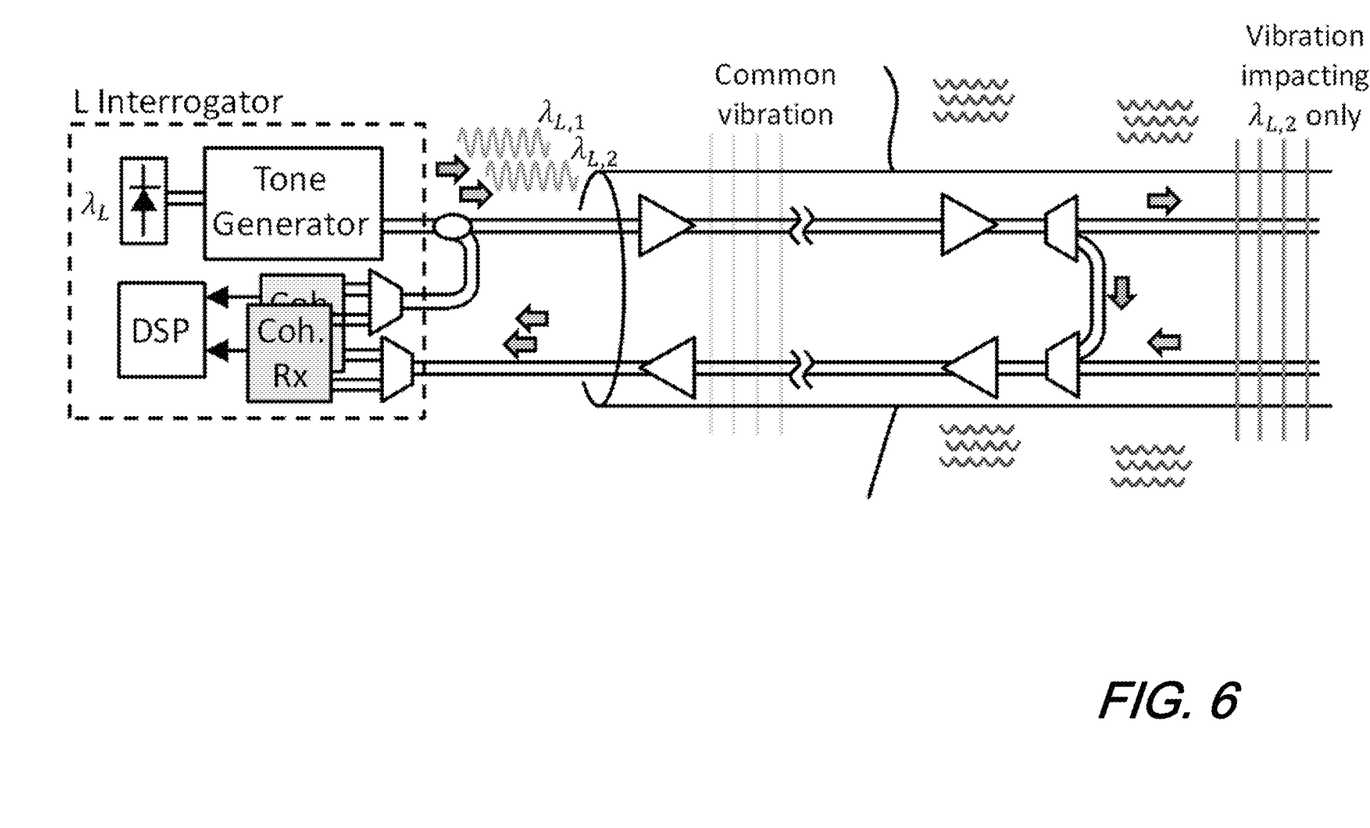
FIG. 6 shows schematic diagram of an illustrative improved configuration for rejecting common-mode mechanical vibration(s) in an undersea fiber cable application that uses ultra-stable laser interferometry according to aspects of the present disclosure wherein a fiber turnaround is placed just beyond the shore in the undersea application to mitigate undesired near shore vibration(s)
Figure 7:
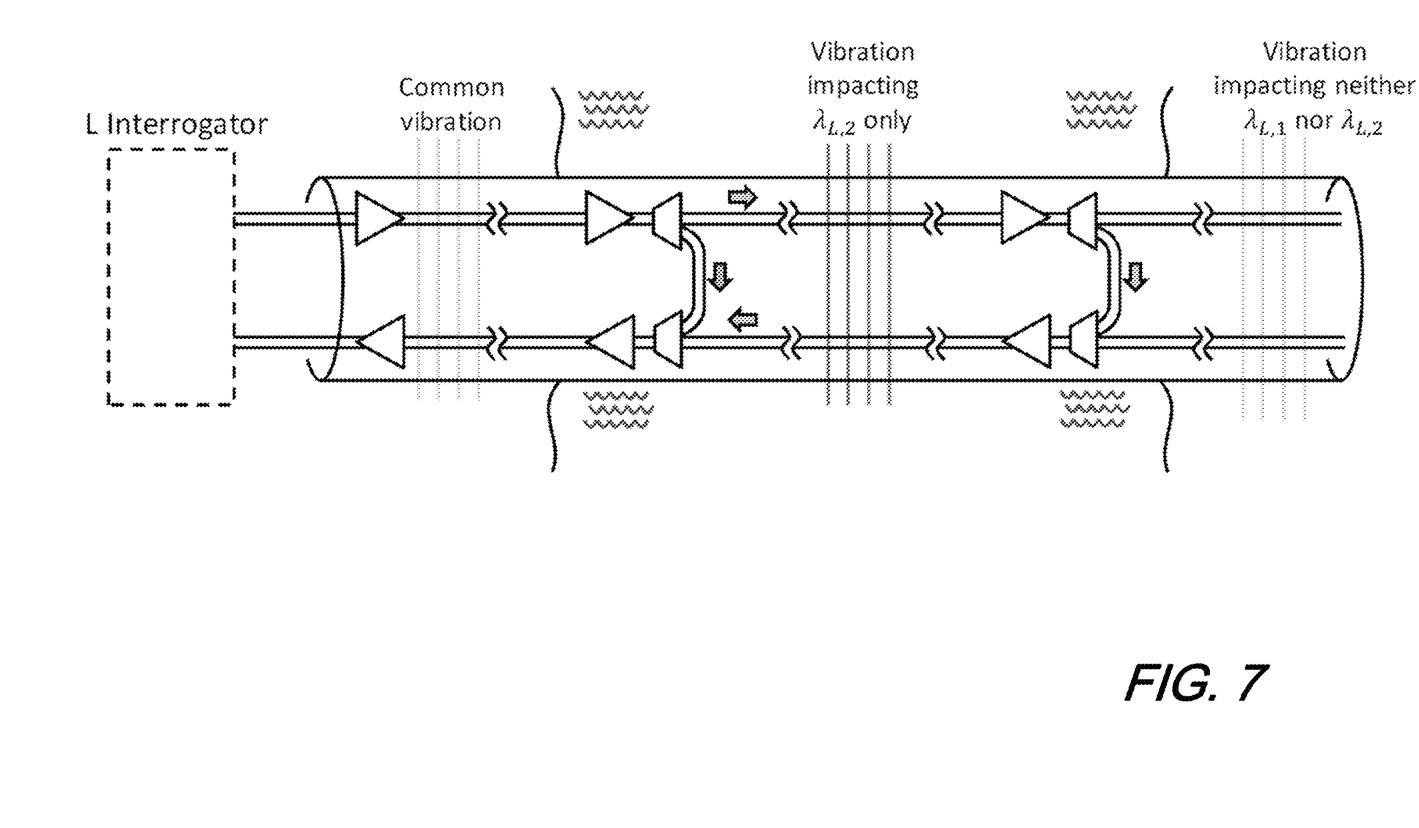
FIG. 7 shows schematic diagram of an illustrative improved configuration for rejecting common-mode mechanical vibration(s) in an undersea fiber cable application that uses ultra-stable laser interferometry according to aspects of the present disclosure wherein a fiber turnaround is placed just before the shore at a remote end in the undersea application to mitigate undesired near shore vibration(s) at that remote end.

Examples of fiber turnarounds incorporated into a submarine cable may be observed in FIG. 4, FIG. 6, and FIG. 7.

FIG. 4 shows schematic diagram of an illustrative improved configuration for detecting seismic vibration(s) using ultra-stable laser interferometry according to aspects of the present disclosure wherein a same laser that generates an outgoing signal also provides local oscillator allowing for mitigation of low-frequency laser phase noise.

As shown in that figure are two interrogators positioned at opposite ends of an undersea optical cable. Each of the interrogators L Interrogator and R Interrogator—include a laser light source operating at a specific wavelength for the L Interrogator and R Interrogator that are in optical communication with the undersea optical cable. Along with the laser(s), each of the interrogators include a coherent receiver which is in optical communication with the optical cable. As shown further, the optical cable includes at least a pair of separate optical fibers that are configured directionally—one from the L Interrogator to the R Interrogator and conversely one from the R Interrogator to the L Interrogator.

Advantageously, we improve the performance of detecting $\phi_{vib}(t)$ by using the system architecture as shown illustratively in FIG. 4 which reduces the spectral density of phase noise. With continued reference to that figure, we note that at the R interrogator, instead of simply coherently detecting a L-R signal, such signal is transmitted to a far end (R) of the optical cable and at least a portion of that signal is demultiplexed by a demultiplexer and then multiplexed by a multiplexer and routed back to the L interrogator via a different fiber in the same optical cable. The routed back L-R signal is demultiplexed by a demultiplexer and coherently detected by the L interrogator, which allows the same laser to be used to both generate the outgoing signal and as local oscillator. A demultiplexed portion of the routed back L-R signal is multiplexed by a multiplexer as part of an R-L signal.

The phase of the received signal is thus $\phi_{L,Rx}(t)=\phi_{L,Tx}(t-T_{rt})+\phi_{AWGN}(t)$, where $T_{rt}=2n_{eff}L/c$ is the round-trip delay, while $\phi_{L,LO}(t)=C_{L,Tx}(t)$. Their coherent beat product produces a phase of $\phi(t)=P_L(t-T_{rt})-\phi_L(t)+\phi_{AWGN}(t)$.

Ignoring the contribution by ASE noise, this phase has a Fourier transform of:

$$\Phi(f)=\Phi_{PN}(f)[1-e^{-j2\pi fT_{rt}}]=j2e^{-j\pi fT_{rt}}\Phi_{PN}(f)\sin(\pi fT_{rt}). \quad (7)$$

Thus PSD of phase noise in this scheme is:

$$S_{\phi\phi}(f)=4S_{\phi_{PN}\phi_{PN}}(f)\sin^2(\pi fT_{rt})[\text{rad}^2/\text{Hz}]. \quad (8)$$

As compared with the original scheme, which produces a phase noise PSD of $S_{\phi\phi}(f)=2S_{\phi_{PN}\phi_{PN}}(f)$ [rad$^2$/Hz] assuming transmit and LO lasers are independent but have the same phase noise characteristics, the current scheme according to aspects of the present disclosure has a multiplication factor of $4\sin^2(\pi fT_{rt})$. At low frequencies where $f \ll 1/T_{rt}$, $\sin^2(\phi fT_{rt})\approx(\pi fT_{rt})^2$ so phase noise is suppressed. This is intuitive since at modulation frequencies $f_{mod}$ lower than the round-trip frequency $1/T_{rt}$, the return signal's phase $\phi_{mod}(t-T_{rt})=A\cos(2\pi f_{mod}(t-T_{rt}))$ will be almost identical to the outgoing signal's phase $\phi_{mod}(t)=A\cos(2\pi f_{mod}t)$. Low frequency modulation on the laser's phase is canceled by delay interferometry.

Figure 5:
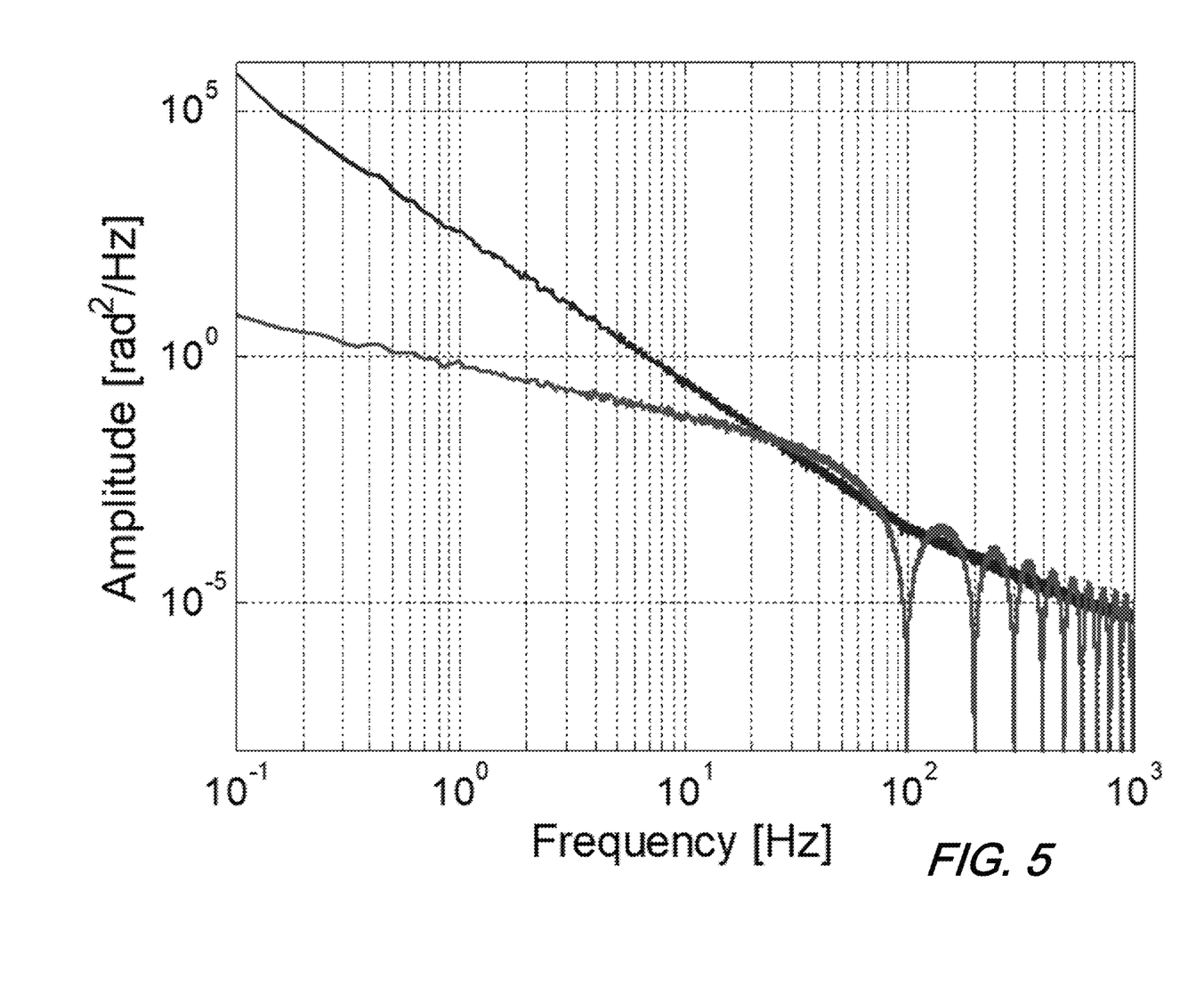
FIG. 5 shows a plot of simulation data comparing the phase spectra using the conventional, prior-art method and improved method according to aspects of the present disclosure.

FIG. 5 shows a plot of simulation data comparing the phase spectra using the conventional, prior-art method and improved method according to aspects of the present disclosure. With reference to that figure, one line shows the spectrum of $\phi(t)$ using the first scheme when the transmitter and receiver (LO) lasers are different, while the other line shows the spectrum of $\phi(t)$ using a scheme according to the present disclosure—illustratively when the LO is the transmit laser signal delayed by 10 ms, corresponding to a cable length of ~1000 km. In this simulation, all lasers are modeled to have Lorentzian linewidth of 10 Hz and a corner frequency $f_0$ of 100 Hz, below which technical 1/f noise dominates.

Phase noise suppression is observed for frequencies below $\approx 1/2\pi T_{rt}=16$ Hz. At 1 Hz and 10 Hz, the phase noise suppression ratio $(2\pi fT_{rt})^2$ are −24 dB and 4 dB, respectively. Since seismic vibration has its energy concentrated mostly between 1 and 10 Hz, the proposed scheme improves laser phase noise tolerance by the same magnitude.

It is possible to further extend the concept of using a fiber return to reject common-mode mechanical vibration, such as near landing stations in submarine links where mechanical vibration is strongest near the shore. As those skilled in the art will appreciate, to detect a seismic vibration on the ocean floor, it may be necessary to cancel the strong vibrations near the shore.

FIG. 6 shows schematic diagram of an illustrative improved configuration for rejecting common-mode mechanical vibration(s) in an undersea fiber cable application that uses ultra-stable laser interferometry according to aspects of the present disclosure wherein a fiber turnaround is placed just beyond the shore in the undersea application to mitigate undesired near shore vibration(s). As illustratively shown in this figure, a near-shore L interrogator includes a tone generator, coherent receivers, and a signal processor (digital signal processor—DSP).

We note that in the configuration shown in FIG. 6, two frequency tones are generated from the same seed laser. One tone propagates to the other end of the cable and returns via a different fiber in the same cable. The other tone is turned around at an output of a first optical amplifier immediately after a landing station, which is at distance $L_T$ from the L interrogator.

The optical phase due to mechanical strain at the two frequencies are:

$$\phi_{vib,1}(t)=\frac{2\pi}{\lambda_1}\int_0^{L_T}\Delta\epsilon(z)dz \text{ and } \phi_{vib,2}(t)=\frac{2\pi}{\lambda_2}\int_0^{L_T}\Delta\epsilon(z)dz+\frac{2\pi}{\lambda_2}\int_{L_T}^{L}\Delta\epsilon(z)dz.$$

Note that $\phi_{vib,1}(t)$, is the undesired phase due to cumulative mechanical strain between the transmitter and the shore. $\phi_{vib,1}(t)$ has the same form as the first term of $\phi_{vib,2}(t)$ apart from a scaling factor equal to the ratio of their wavelengths $\lambda_1/\lambda_2$. It is possible to coherently detect both tones and retrieve their phases $\phi_1(t)=\phi_{vib,1}(t)+\phi_{Tx}(t-2n_{eff}L_T/c)-\phi_{Tx}(t)+\phi_{AWGN,1}t)$ and $\phi_2=\phi_{vib,2}(t)+\phi_{Tx}(t-2n_{eff}L/c)-\phi_{Tx}(t)+\phi_{AWGN,2}$. The difference $\phi(t)=\phi_2(t)-(\lambda_1/\lambda_2)\phi_1(t)$ will be free of undesirable landing station vibration $\phi_{vib,1}(t)$. Note this method potentially increases the impact of phase error due to laser phase noise and ASE noise, but if vibration near the landing station, $\phi_{vib,1}(t)$, is the dominant source of interference over seismic frequencies of interest as shown in the configuration of FIG. 3, this method will reduce its impact.

Note that suppression of near-shore vibration is possible because the two tones traveled in the same fiber cores (both outbound and inbound directions), so they experience identical mechanical strains. Note further that turning the outbound signal around just before the landing station at the remote end will also mitigate mechanical noise the far-end landing station.

FIG. 7 shows schematic diagram of an illustrative improved configuration for rejecting common-mode mechanical vibration(s) in an undersea fiber cable application that uses ultra-stable laser interferometry according to aspects of the present disclosure wherein a fiber turnaround is placed just before the shore at a remote end in the undersea application to mitigate undesired near shore vibration(s) at that remote end.

As noted previously, such configuration allows the interrogator to perform coherent detection using the same laser as that which generated the outgoing signal. Thought of alternatively, we thus convert laser interferometry using two independent lasers into delay interferometry. As shown by Eq. (7), phase noise is suppressed at low frequencies where seismic vibration energy is concentrated, relaxing the requirement on the phase noise spectrum of the laser. The use of fiber turnarounds in FIG. 6 and FIG. 7 also allows cancellation (and/or mitigation) of undesired near-shore mechanical vibration caused by ships, machinery, etc.

While we have presented this disclosure using some specific examples, those skilled in the art will recognize that our teachings are not so limited. Accordingly, this disclosure should be only limited by the scope of the claims attached hereto.

The invention claimed is:

1. An improved laser interferometric arrangement for detecting low frequency vibrations comprising:
   a pair of optical fibers;
   an optical fiber sensing interrogator including a laser source, a coherent receiver, and a signal processor, the interrogator in optical communication with the optical fibers at a near end of the fibers, the interrogator having an input port and an output port, the input port optically connected to one of the fibers and the output port connected to the other one of the fibers; and
   a fiber turnaround optically connecting the optical fibers at a point near a far end of the fibers;
   wherein the interrogator generates optical interrogation signals and outputs them to the fiber optically connected to its output port, and receives a portion of the output signals at its input port after such received signals traverses the fiber turnaround;
   wherein the received signals are coherently detected using the same laser source as a local oscillator by the coherent receiver.

2. The arrangement according to claim 1 wherein the coherent receiver generates a homodyne electrical output.

3. The arrangement according to claim 2 wherein the homodyne electrical output is low-pass filtered and vibrations impacting the optical fibers are determined from the filtered electrical output by the signal processor.

4. The arrangement according to claim 3 further comprising a second optical fiber sensing interrogator located at the far end of the optical fibers at a point beyond the fiber turnaround, and a second fiber turnaround positioned at a near end of the optical fibers.

5. The arrangement according to claim 4 wherein the two interrogators are synchronized to a common clock.

6. The arrangement according to claim 5 wherein the two interrogators are configured to operate simultaneously, and location(s) of vibrations are determined by a relative delay in vibration measurements by the two interrogators.

7. The arrangement according to claim 6 wherein the two interrogators utilize different wavelengths on the same fibers.

8. The arrangement according to claim 5 wherein the two interrogators utilize the same wavelengths on different pairs of fibers, each of the different pairs included in a common optical cable.

9. The arrangement according to claim 3 wherein the interrogator transmits two phase-locked tones wherein only one of the tones is returned by the fiber turnaround.

10. The arrangement according to claim 3 wherein the fiber turnaround comprises a wavelength demultiplexer in optical communication with one of the fibers, and a wavelength multiplexer in communication with the other fiber, and a length of fiber connecting one or more ports of the demultiplexer to the multiplexer.

11. The arrangement according to claim 1 wherein the optical fibers are included in an undersea cable.

12. The arrangement according to claim 11 wherein the fiber turnaround near the far end is at an offshore, undersea location.

* * * * *